(12) United States Patent
Gil

(10) Patent No.: US 11,773,885 B2
(45) Date of Patent: Oct. 3, 2023

(54) AUTOMATIC RELEASE CLAMP

(71) Applicant: United Parcel Service of America, Inc., Atlanta, GA (US)

(72) Inventor: Julio Gil, Veldhoven (NL)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 361 days.

(21) Appl. No.: 17/136,405

(22) Filed: Dec. 29, 2020

(65) Prior Publication Data

US 2022/0205469 A1    Jun. 30, 2022

(51) Int. Cl.
| | |
|---|---|
| *B64C 39/02* | (2023.01) |
| *B64D 1/22* | (2006.01) |
| *B66C 1/34* | (2006.01) |
| *F16B 2/10* | (2006.01) |
| *B66C 1/42* | (2006.01) |
| *B64U 101/60* | (2023.01) |

(52) U.S. Cl.
CPC .............. *F16B 2/10* (2013.01); *B64C 39/024* (2013.01); *B64D 1/22* (2013.01); *B66C 1/422* (2013.01); *B64U 2101/60* (2023.01)

(58) Field of Classification Search
CPC ... F16B 2/10; B64C 2201/128; B64C 39/024; B64D 1/22; B66C 1/422
USPC ....................................................... 294/86.29
See application file for complete search history.

(56) References Cited

U.S. PATENT DOCUMENTS

| | | | | | |
|---|---|---|---|---|---|
| 1,966,240 | A | * | 7/1934 | Erdahl | B66C 1/422 294/902 |
| 3,317,235 | A | * | 5/1967 | Botten | B66C 1/422 294/112 |
| 3,322,455 | A | * | 5/1967 | Gressbach | B66C 1/442 294/902 |
| 3,451,711 | A | * | 6/1969 | Carpenter | B66C 1/422 294/81.61 |
| 4,030,625 | A | * | 6/1977 | Koehnen | A01G 23/003 294/115 |
| 5,074,608 | A |   | 12/1991 | Gabriel | |
| 5,398,983 | A | * | 3/1995 | Ahrens | B65F 3/02 294/106 |

(Continued)

FOREIGN PATENT DOCUMENTS

| | | |
|---|---|---|
| CN | 108583903 A | 9/2018 |
| JP | 2-22986 U | 2/1990 |

(Continued)

OTHER PUBLICATIONS

International Search Report and Written Opinion received for PCT Patent Application No. PCT/US2021/065393, dated May 4, 2022, 7 pages.

*Primary Examiner* — Paul T Chin
(74) *Attorney, Agent, or Firm* — SHOOK, HARDY & BACON L.L.P.

(57) ABSTRACT

Aspects herein are directed to a clamp having a linkage coupled to a first end of a first and second clamp member. Based on applying a first directional force to the linkage, the linkage generates a force that moves the second ends of the first and second clamp member towards one another, thereby biasing the clamp to the closed position. The clamp secures a strap when the clamp is in the closed position and releases the strap when the clamp is in an open position.

20 Claims, 11 Drawing Sheets

(56) References Cited

U.S. PATENT DOCUMENTS

| | | | | |
|---|---|---|---|---|
| 5,611,587 | A | * | 3/1997 | Brown ...................... B66C 3/06 |
| | | | | 294/111 |
| 6,012,752 | A | * | 1/2000 | Douglas .................. B66C 1/422 |
| | | | | 294/119 |
| 8,287,015 | B2 | * | 10/2012 | Hawes ................... B65G 47/90 |
| | | | | 294/902 |
| 9,956,691 | B1 | * | 5/2018 | Pentzer ................... B25J 15/08 |
| 11,059,184 | B2 | * | 7/2021 | Pedersen ............. B25J 15/0206 |
| 2004/0057820 | A1 | * | 3/2004 | Smith ...................... B65F 3/04 |
| | | | | 414/408 |

FOREIGN PATENT DOCUMENTS

| | | |
|---|---|---|
| JP | 2018-10716 A | 1/2018 |
| JP | 2020-183326 A | 11/2020 |
| JP | 2020-200123 A | 12/2020 |

* cited by examiner

AUTOMATIC RELEASE CLAMP

BACKGROUND

Delivering parcels using drones, in particular unmanned aerial vehicles (UAVs) or unmanned ground vehicles (UGVs), is becoming a reality. Currently, there are some UAVs or UGVs that deliver parcels by lowering the parcel downward from the vehicle using a line. Lowering parcels downward from an altitude of the vehicle is beneficial because it allows the vehicle to remain at a safe distance above or beside a surface, so that it can avoid interaction with objects and people. This increases the safety of UAV and UGV delivery, and it allows a delivery of an item to a greater number of locations, such as locations that would be difficult for a UAV or UGV to traverse.

The drawback, however, is that current systems do not have an efficient means to quickly secure the item during transportation and automatically release the item upon delivery. Additionally, current systems do not release the parcel upon delivery without the use of complicated electronic systems and sensors, which can easily be damaged during the transportation of the parcel or after repeated use. These electronic systems and sensors may also reduce the effective range of the UAV or UGV because they draw energy from the propulsion system. Alternatively, the electronic systems and sensor may draw energy from additional batteries, but additional batteries would increase the overall weight of the vehicle and decrease the effective range of the vehicle.

SUMMARY

At a high level, aspects described herein relate to a clamp that is used in combination with a strap so as to secure an item. The clamp comprises a first and second clamp member that each have a first end and a second end. The first and second clamp member may be pivotally coupled together and may move between an open and closed position. The clamp may be used in combination with a strap to secure an item, for example, by wrapping the body of the strap around the item. The ends of the strap may then be secured in place by the clamp, such as when the clamp is in the closed position. In some instances, a protrusion at the second end of the clamp may engage an aperture in the strap when the clamp is in the closed position, further securing the strap in place.

The clamp may utilize the weight of the item to generate a clamping force, for example when the item is lifted or suspended. Specifically, a line (e.g., a cable) may generate a first directional force that acts on a linkage of the clamp. The linkage may be coupled to the first end of the first clamp member and the first end of the second clamp member. In response to the first directional force, the linkage generates a second directional force that acts on the first ends of the first and second clamp members so as to cause the second ends of the first and second clamp members to move towards one another, thereby biasing the clamp to the closed position. When the first directional force decreases or is removed (e.g., when the item is not being lifted or suspended), the clamp may move to the open position and release the strap. In this manner, the clamp may be used to automatically secure (or release) the item based on the weight of the item. Additionally, the second directional force may be proportional to the weight of the item so as to resist the clamp moving to the open position. For instance, a second directional force that is generated by suspending a heavier item will be greater than a second directional force that is generated by suspending a lighter item. It should be appreciated that the clamp may include a tensioning element that biases the clamp to an open position, allowing the clamp to open when the item is resting on a surface (e.g., when the item is not being lifted or suspended).

Another aspect of the clamp may include one or more extension members. The one or more extension members may assist in moving the clamp to the open position. For example, the one or more extension members may bias the clamp to the open position when the item is lowered to a resting surface. Specifically, the one or more extension members have a dimension that allows them to extend below the item that is secured by the clamp. That is, the one or more extension members may extend from the first end of the clamp to a location that is lower than any surface of the item. As the item is lowered to the resting surface, the one or more extension members may engage the resting surface, causing them to move and apply a force to the first ends of the clamp. In turn, this causes the second ends of the clamp to move away from one another, thereby releasing the strap. Further, as described herein, the clamp may include a tensioning element that biases the clamp to the closed position. By engaging the resting surface, the one or more extension members may resist the bias of the clamp to the closed position so as to move the clamp to the open position.

The one or more extension members may also assist in keeping the clamp in the closed position. For instance, the one or more extension members may bias the clamp to the closed position when the item is being suspended. In some aspects, the weight of the one or more extension members may assist in generating a clamping force by providing a torque about a hinge of a clamp. The one or more extension members may assist in keeping the clamp in a closed position during transportation. For example, the weight of the item may decrease if it is lowered at a significant speed. Because the clamping force generated by the linkage is proportional to the weight of the item being lifted or suspended, the clamp may be at risk of releasing the strap if the item is lowered at a significant rate. However, the one or more extension members may provide an additional clamping force that bias the clamp to the closed position.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
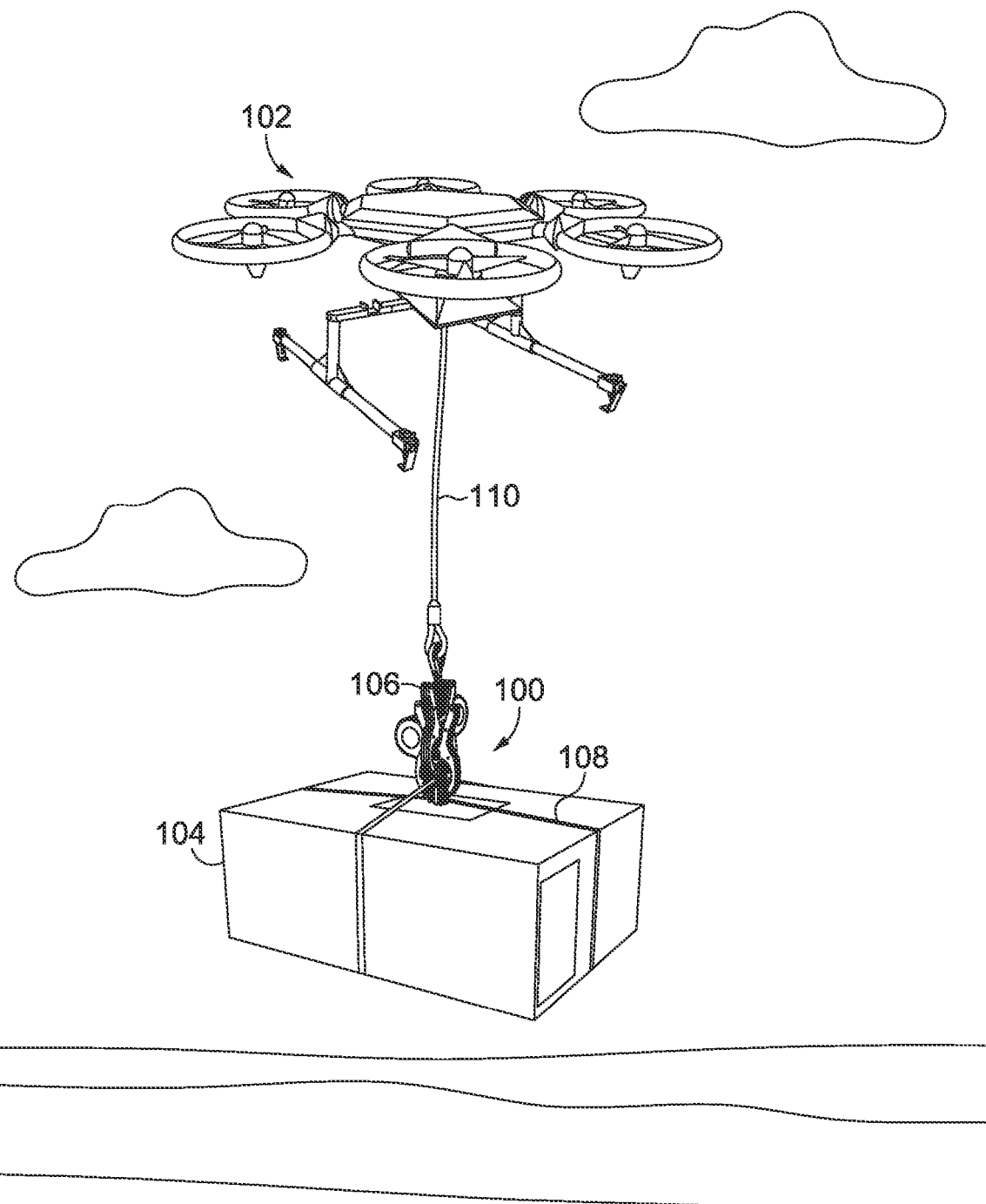
FIG. 1 is a perspective view of a clamp used with a harness for moving an item, in accordance with an aspect described herein.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

This disclosure provides for a clamp that can be used in combination with a strap so as to secure an item while the item is suspended (e.g., lifted). The clamp can also be used to automatically release the item when the item is lowered to a resting surface (e.g., the ground).

At a high level, the clamp may be used in combination with a strap so as to secure an item to be moved. The clamp comprises a first and a second clamp member that each have a first end and a second end. The first and second clamp member may be pivotally coupled together and may move between an open and closed position. The clamp may be used in combination with a strap to secure an item, for example, by wrapping the body of the strap around the item. The ends of the strap may then be secured in place by the clamp, such as when the clamp is in the closed position. In some aspects, the clamp may have a protrusion at the second end of one of the clamp members. The protrusion may engage an aperture in the strap when the clamp is in the closed position, thereby further securing the strap in place.

The clamp may utilize the weight of the item to generate a clamping force that is proportional to the weight of the item. For example, when the item is suspended by a line (e.g., a cable or rope), the line may generate a first directional force. The line may be coupled to a linkage of the clamp, which generates a second directional force (also referred to as a clamping force) in response to the first directional force. The second directional force may then bias the clamp to the closed position. In some aspects, the second directional force causes the first ends of the clamp away from one another, which results in the second ends moving towards one another.

The linkage may be coupled to the first end of the clamp. The linkage may move with respect to the clamp members. Additionally, the linkage may include one or more linkage members that move with respect to each other. The movement of the one or more linkage members allow the clamp to move between the open and closed position.

Further, the location of the linkage (or one or more linkage members) may assist in generating the second directional force and may be described with respect to the clamp members. For example, the one or more linkage members may extend toward an opening formed between the clamp members. The location of the linkage (or one or more linkage members) may also be described with respect to an angle that is measured from the first directional force. For example, the one or more linkage members may be located so as to generate the second directional force at an angle of about 0 to 90 degrees as measured with respect to the first directional force.

To release the item, the item may be lowered to a resting position on a surface. As the first directional force decreases (e.g., when the item is not being lifted or suspended), the second directional force decreases, thereby allowing the clamp to move to the open position and release the strap. In this manner, the clamp may be used to automatically secure or release the item based on the weight of the item. In some aspects, the strap is retractably mounted to the clamp such that the strap retracts when it is released from the clamp. Retractably mounting the strap to the clamp (e.g., via a retractable device) provides a functional advantage because the strap may be caught between the item and the resting surface and a retraction force provided by the retractable device can assist in freeing the strap from being caught.

As described in greater detail below, one or more tensioning elements may bias the clamp to the open or closed position. In some aspects, a tensioning element may bias the clamp to the open position when the second directional force (i.e., the clamping force) decreases or is absent. In other aspects, the one or more tensioning elements may bias the clamp to the closed position.

The clamp may also include one or more extension members that bias the clamp to the closed position. For instance, the weight of the one or more extension members may generate a torque with respect to a hinge of the clamp to bias the clamp to the closed position. As described herein, the clamping force may be proportional to the weight of the item being suspended. As such, there is a risk that the clamping force is reduced (or completely terminated) if an item is lowered at a significant rate. To ensure the clamp stays in the closed position, the weight of the one or more extension members may generate a force that biases the clamp to the closed position.

The one or more extension members may have one or more dimensions that allow them to extend below the item that is secured by the clamp. As the item is lowered to a surface, the one or more extension members may engage the surface before the weight of the item is resting on the surface. In response to engaging the surface, the one or more extension members may bias the clamp to the open position.

FIG. 1 depicts example harness 100 used in transporting an item 104 with a UAV 102. As illustrated, harness 100 may be a cradle, housing, or holster that secures the item 104 such that the item 104 may be lifted or moved (e.g., transported). While the item 104 is illustrated as being lifted using the UAV 102, the harness 100 is not limited to being used in combination with a UAV. Harness 100 may be used in combination with any vehicle or device having a crane, hoist, or winch. Additionally, it is contemplated that while the harness 100 is said to secure the item 104, the term secure is not meant to be interpreted as a permanent attachment. For instance, the harness 100 may be removed from the item 104 such that item 104 is removably secured.

The harness 100 may comprise a clamp 106 and a strap 108. The clamp 106 may secure a strap 108 that wraps around the item 104. The item 104 may be any physical object and may include any number of objects. As illustrated, the item 104 may be a parcel. The clamp 106 may be coupled to line 110 that is used to suspend (e.g., lift or carry) the item 104. The line 110 may thus move the item 104 through the air (e.g., aerially transporting the item).

The line 110 may generate a first directional force based on suspending the item 104. The first directional force may be a vertical force. The first directional force may be a force that resists the force of gravity acting on a load (e.g., item 104 or harness 100, or a combination thereof) being lifted by the line 110. As illustrated, the harness 100 may include multiple clamps and multiple straps, which are described in greater detail with respect to FIGS. 4-5, to move the item 104. For example, multiple straps may wrap around the item 104 in different directions so as to secure the item 104 while it is being moved.

Figure 2A:
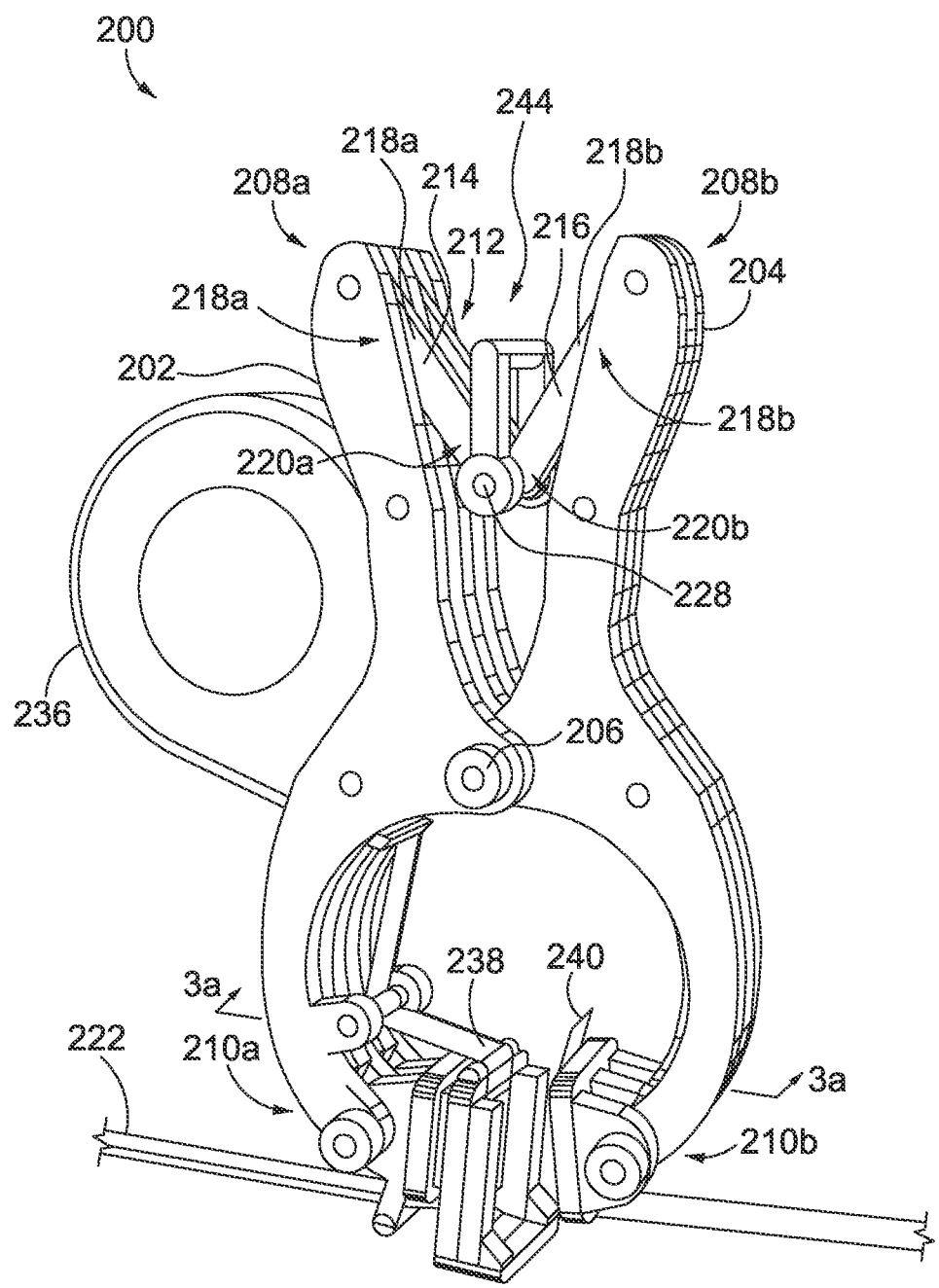
FIGS. 2A-B are perspective views of a clamp in an open and closed position, respectively, in accordance with an aspect described herein.

FIG. 2A is a perspective view of a clamp 200 in an open position. As illustrated, the clamp 200 includes a first clamp member 202 coupled to a second clamp member 204. The first clamp member 202 may move with respect to the second clamp member 204 such the clamp moves from an open to a closed position. In some aspects, the first clamp member 202 is pivotally coupled to a second clamp member 204. For instance, the first clamp member 202 may be coupled to the second clamp member 204 via a hinge 206. The hinge 206 may be located between a first end 208 and the second end 210. In some aspects, the hinge 206 may include a pin or bolt that extends through an aperture(s) in the first clamp member 202 or the second clamp member 204, or a combination thereof. Additionally, as described herein, the clamp may include a tensioning element (e.g., a torsional spring) positioned at the hinge 206 to bias the clamp to the open or closed position.

The clamp 200 includes a linkage 212 that coupled to first ends 208a-b of the clamp 200. The first ends 208a-b of the clamp 200 may be spaced apart from each other so as to form an opening 244 therebetween. The linkage 212 may be positioned so as to generate a clamping force. As illustrated, the linkage 212 may extend into the opening 244. The position of the linkage 212 is further described with respect to FIG. 2B.

Figure 2B:
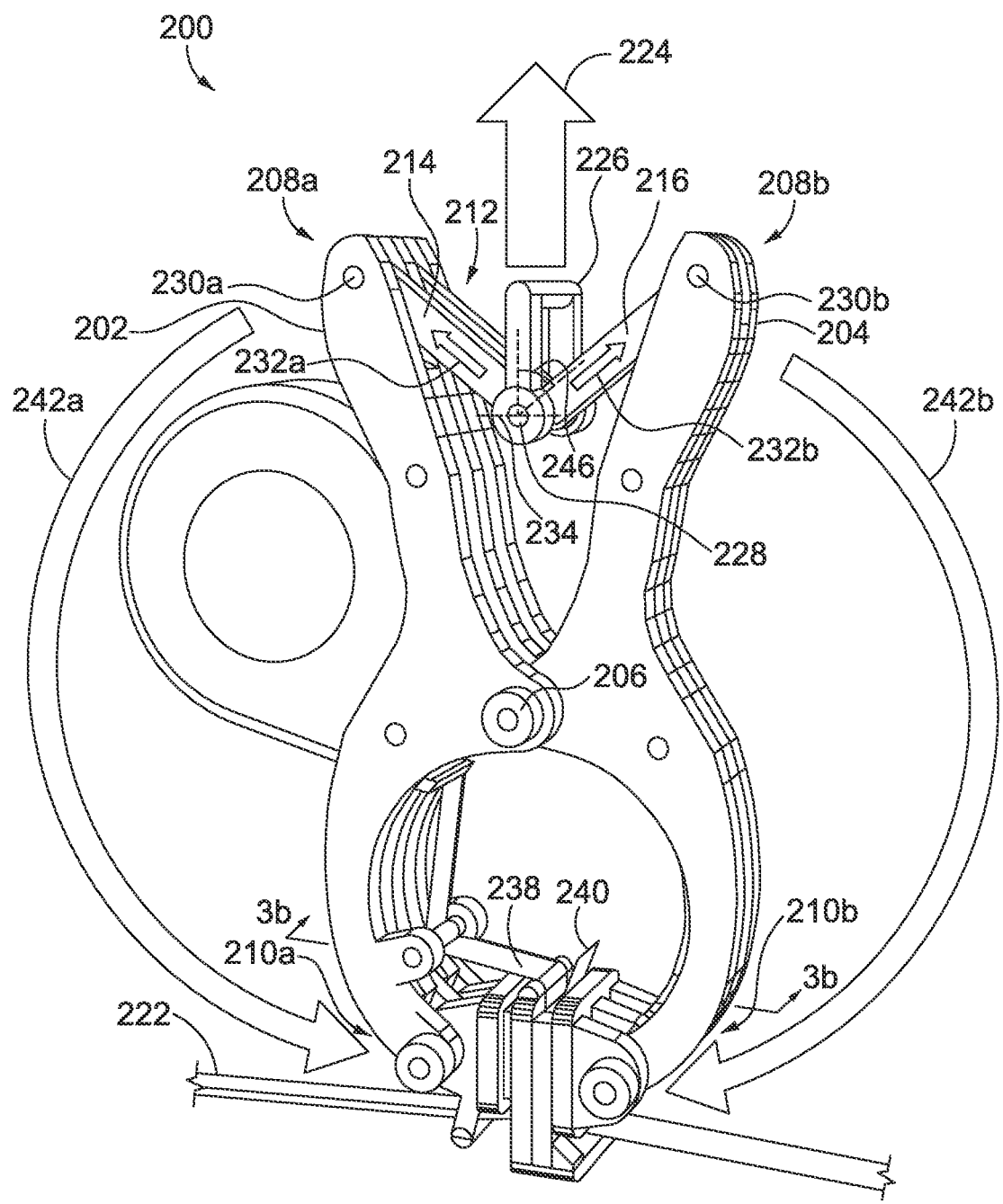

The linkage 212 may move with respect to the first clamp member 202 and the second clamp member 204. The movement of the linkage 212 may allow the clamp 200 to move between the open and closed positions. Referring to FIGS. 2A-B, the linkage 212 may move from a first position (the position of the linkage illustrated in FIG. 2A) to a second position (the position of the linkage illustrated in FIG. 2B), allowing the clamp 200 to move from the open position to the closed position respectively. The first position may be below the second position. As the clamp 200 moves from the open position to the closed position, the linkage 212 moves toward the first ends 208a-b of the clamp 200. It is advantageous that the linkage 212 is able to move with respect to the clamp 200 because it allows the linkage 212 to generate a force to bias the clamp 200 to the closed position. It is contemplated that the linkage 212 does not move beyond the first ends 208a-b of the clamp 200.

Continuing, the linkage 212 may include one or more linkage members. As illustrated, the linkage 212 includes a first linkage member 214 and a second linkage member 216. First ends 218a-b of the first linkage member 214 and the second linkage member 216 may be coupled to the first ends 208a-b of the clamp 200. The first and second linkage members 214, 216 may be coupled to the clamp 200 in such a way that the first and second linkage members 214, 216 can move with respect to the clamp 200. For example, the first ends 218a-b of the first linkage member 214 and the second linkage member 216 may be pivotally coupled to the first ends 208a-b of the clamp 200. This allows the first linkage member 214 to move (e.g., pivot) with respect to the first clamp member 202 and the second linkage member 216 to move (e.g., pivot) with respect to the second clamp member 204. It is contemplated that the one or more linkage members may be coupled in any manner that allows them to move with respect to the clamp 200. Example pivot coupling mechanisms include any type of hinge, including a joint hinge (e.g., ball and socket joint), pin or bolt hinge, sliding hinge (e.g., the first ends 218a-b of the first and second linkage members 214, 216 may slide along grooves of the first and second clamp members 202, 204), or the like. It is advantageous that the one or more linkage members are able to move with respect to the first and second clamp members 202, 204 so the clamp 200 can move between the open and closed position.

In some aspects, the one or more linkage members of linkage 212 are coupled to one another in such a way that allows them to move with respect to one another. In particular, a second end 220a of the first linkage member 214 is pivotally coupled to a second end 220b of the second linkage member 216. In some aspects, the first linkage member 214 and the second linkage member 216 are pivotally coupled at hinge 228. Hinge 228 may be any type of hinge, including a joint hinge (e.g., ball and socket joint), pin or bolt hinge, sliding hinge, or the like. It is contemplated that the one or more linkage members may be coupled in any manner that allows them to move with respect to one another. As illustrated, the hinge 228 includes a pin or bolt that extends through an aperture(s) in the first linkage member 214 and the second linkage member 216. As discussed in greater detail below, a coupling member 244 may be coupled to the first and second linkage member 214, 216 at the hinge 228.

Referring still to FIG. 2A, the clamp 200 may be used in combination with a strap 222 to secure an item (e.g., item 104). The strap 222 has a body extending between a first end 238 and a second end 240. As illustrated, the first end 238 of the strap 222 may be coupled (e.g., attached) to the first clamp member 202 while the second end 240 remains uncoupled (e.g., unattached or loose) from the second clamp member 204. In some aspects, the strap 222 may be coupled to the first member 202 in a way that causes the second end of the strap 222 retract toward the first clamp member 202. For instance, the strap 222 may be loaded within a spring loaded housing that generates a retracting force that pulls the second end 240 toward the first clamp member 202. The strap 222 may be a flexible strap made of any material, including synthetic or natural material, that allows it to fit the size or shape of the item (e.g., item 104).

Referring to both FIGS. 2A-B, to prepare the item for moving, the body of the strap 222 may be positioned around the item and then secured by the clamp 200 by moving the clamp 200 from the open position to the closed position. In particular, referring to FIG. 2B, a first directional force 224 may be applied to the linkage member 212, for example, while the item is suspended (e.g., lifted). The first directional force 224 may be created by a line (e.g., line 110) that is coupled to the linkage 212 via the coupling member 226. The coupling member 226 may be pivotally coupled to the linkage 212. For instance, the coupling member 226 may be pivotally coupled to the hinge 228.

Continuing, as the first directional force 224 is applied to the linkage member 212 (e.g., via the coupling member 226), the linkage 212 generates a second directional force 232a-b (e.g., clamping force 232a-b) that biases the clamp 200 to the closed position. In particular, the linkage 212 generates the second directional force 232 that causes the first ends 208a-b of the clamp 200 to move away from one another. This, in turn, generates a third directional force 242a-b that causes the second ends 210a-b of the clamp 200 to move toward each other and toward the closed position. The third directional force 242a-b may be a torque that is generated by the clamping force 232a-b with respect to hinge 206. Utilizing the first directional force 224 to secure the item is advantageous because it creates a clamping force (e.g., clamping force 232a-b) that is directly proportional to the weight of the item. Additionally, it allows for an efficient and automatic release of the item.

It should be appreciated that the location of the linkage 212 member may assist in biasing the clamp 200 to the closed position. For example, the linkage 212 may be coupled to the first and second clamp member 202, 204 at the first ends 208a-b. As used herein, term "end" should be interpreted broadly. For example, the end may include any portion of the clamp member that is generally above or below the hinge 206. Accordingly, in some aspects, the first ends 208a-b may be the portion of the clamp member that is above the hinge 206 while the second ends 210a-b may be the portion of the clamp member that is below the hinge 206.

Continuing, the linkage 212 may be coupled to the first and second clamp member 202, 204 at the first and second location 230a, 230b, respectively. The linkage 212 (e.g., the one or more linkage members) may extend from the first and second location 230a, 230b into the opening 244 located between the first and second clamp member 202, 204. In some aspects, the linkage 212 may extend into the opening 244 of first and second clamp member 202, 204 while the clamp 200 is in the open or closed position, or a combination thereof. The linkage 212 (or the one or more linkage members) may also be described as extending from the first and second location 230a, 230b toward the hinge 206 of the clamp 200. In some aspects, the linkage 212 may extend toward the hinge 206 while the clamp 200 is in the open or closed position, or a combination thereof. The linkage 212 (or one or more linkage members) may also be described as extending from the first and second location 230a, 230b toward the second ends 210a-b of the clamp 200. In some aspects, the linkage 212 may extend toward the second ends 210a-b while the clamp 200 is in the open or closed position, or a combination thereof.

The linkage 212 (e.g., one or more linkage members) may also be described as extending from the first and second location 230a-b toward the opposite clamp member. For instance, the first linkage member 214 may extend from the first location 230a on the first clamp member 202 such that the first linkage member 214 would intersect with the second clamp member 204 if the first linkage member 214 hypothetically extended beyond the hinge 228. Similarly, the second linkage member 216 may extend from the second location 230b on the second clamp member 204 such that the second linkage member 216 would intersect with the first clamp member 202 if the second linkage member 216 hypothetically extended beyond the hinge 228. In some aspects, the linkage 212 may extend toward the opposing clamp member while the clamp 200 is in the open or closed position, or a combination thereof.

The location of the linkage 212 may also be described with reference to the direction (e.g., angle 246) of the clamping force 232a-b with respect the first directional force 224. For example, the first directional force 224 may be a vertical force. In instances where the item is not being moved and is simply being suspended in the air, the first directional force generally forms a 90 degree angle with respect to an x-axis 234. The location of the linkage 212 may be such that it generates the clamping force 232a-b having the angle 246 from about 0 to 90 degrees of the first directional force 224. In some aspects, the linkage 212 may generate the clamping force 232 having an angle 246 from about 20 to 70 degrees of the first directional force 224. In some aspects, the linkage 212 may generate the clamping force 232 having an angle 246 from about 30 to 60 degrees of the first directional force 224. In some aspects, the clamping force 232a-b having an angle 246 does not exceed 90 degrees of the first directional force 224. In some aspects, the clamping force 232a-b having an angle 246 does not exceed 70 degrees of the first directional force 224. In some aspects, the clamping force 232a-b having an angle 246 does not exceed 60 degrees of the first directional force 224. It should be appreciated that the angles described herein can be measured when the clamp 200 is in the closed position or when the clamp 200 is in the open position, or a combination thereof. The term "about" used when, for instance, describing numbers or numerical ranges means within ±10% of a designated value unless indicated otherwise.

In some aspects, the angle 246 may increase as when the clamp 200 moves from the open to closed position. As such, the angle 246 when the clamp 200 is in the closed position may be greater than the angle 246 when the clamp is in the open position 200.

The clamp 200 may have one or more tensioning elements that bias the clamp to the open position. The tensioning element may be any mechanism for biasing the clamp toward the open position, including a spring (e.g., a torsional spring), pulley, elastic material, belt, or the like. In some aspects, the tensioning element is a torsional spring located at the hinge 206.

The clamping force 232a-b generated by the first directional force 224 may resist (e.g., overcome or counteract) the bias of the one or more tensioning elements, thereby moving the clamp 200 to the closed position. In the absence of the clamping force 232a-b, such as when the item is in a resting position on a surface (e.g., when the item is not being lifted or suspended), the one or more tensioning elements may bias the clamp to the open position, allowing the strap 222 to become loose or free from the clamp 200.

Figure 3A:
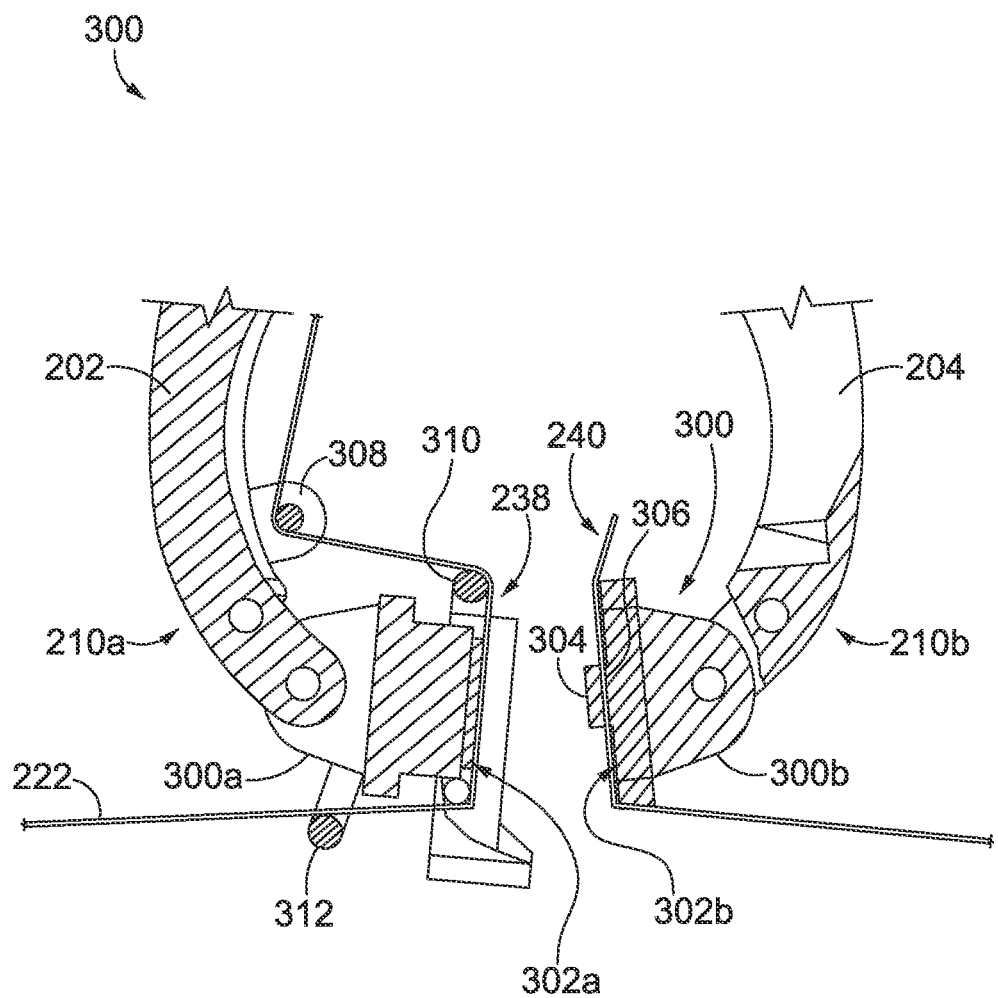
FIGS. 3A-B are enlarged, cross-sectional views of the clamp of FIGS. 2A-B in the open and closed position, in accordance with an aspect described herein.
Figure 3B:
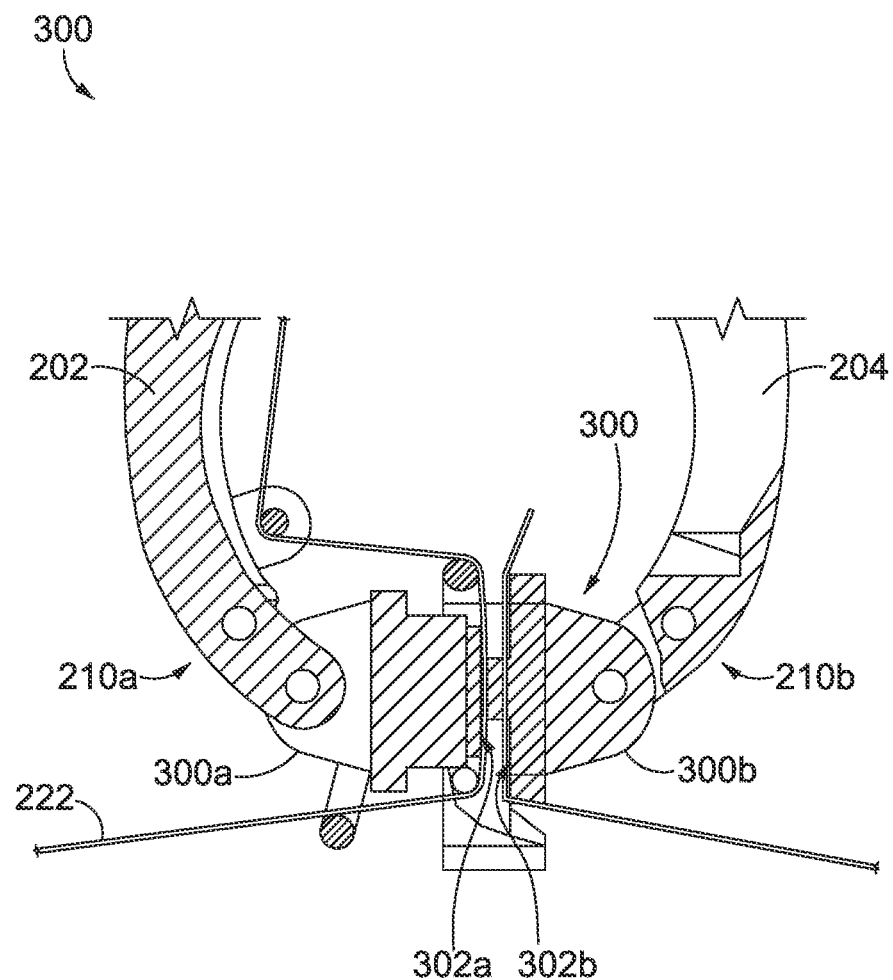

FIGS. 3A-B are enlarged, cross-sectional views of the second ends 210a-b of the clamp 200 of FIGS. 2A-B. As mentioned, to secure an item, the strap 222 may be wrapped around the item. Referring to FIG. 3A, the first and second end 238, 240 of the strap 222 may be positioned along a surface of the clamp 200 while the clamp 200 is in an open position. For instance, the first and second end 238, 240 of the strap 222 may be aligned with one or more surfaces (also referred to as one or more clamping surface) located at the second ends 210a-b of the clamp 200. As the clamp 200 moves to the closed position, the one or more surfaces of the clamp 200 may clamp (e.g., squeeze or clutch) the strap 222, thereby securing the strap 222. For instance, the third directional forces 242a-b may cause the one or more clamping surfaces located at the second ends 210a-b to move closer to each other so as to clamp the strap 222.

In some aspects, the strap 222 is secured by a clamp head 300. The clamp head 300 includes a first clamp head 300a and a second clamp head 300b. As illustrated, the first and second clamp head 300a-b are each pivotally coupled (e.g., via a hinge) to the first and second clamp members 202, 204, respectively. The first and second clamp head 300a-b may have a first surface 302a and a second surface 302b (also referred to as a first and second clamping surface 302a, 302b), respectively. While the clamp 200 moves toward the closed position, the first and second surface 302a-b move towards each other to secure (e.g., hold) the strap 222. For instance, the third directional forces 242a-b act to push the first and second surface 302a-b toward one another so as to clamp down on the strap 222. It should be appreciated that while FIG. 3 depicts a gap between the first surface 302a and the second surface 302b, there may not be a gap as the first surface 302a may contact the second surface 302b. For instance, the first surface 302a may contact the second surface 302b.

As illustrated, the second surface 302b of the second clamp head 300b includes a protrusion 304 that engages an aperture 306 of the strap 222. In particular, the protrusion 304 may extend through the aperture 306 located at the second end 240 of the strap 222 while the clamp 200 is in the closed position. It is contemplated that the protrusion 304 may be integral to the second clamping surface 304 (e.g., integrally formed as the same material as second clamping surface 304) or coupled to the second clamping surface 304 (e.g., formed by a separate material that is then coupled to the second clamping surface 304). The protrusion 304 may provide a functional advantage as it further secures the strap 222 because it restricts the second end 240 from moving with respect to the one or more clamping surfaces of the clamp 200 while it is in the closed position. When the clamp moves to an open position, the protrusion 304 may disengage from the aperture 306, allowing the second end 240 of the strap 222 to become loose and, in some instances, retract toward the first clamp member 202.

Continuing, the protrusion 304 may also engage the first end 238 of the strap 222. For example, the protrusion 304 may extend through the aperture 306 and clamp down (e.g., squeeze or clutch) the first end 238 of the strap 222. This may provide a functional advantage because it may further secure the first end 238 of the strap 222 since the protrusion 304 can apply pressure directly to a surface of the first end 238. This is beneficial in instances when the strap 222 is a retractable strap because a retractable strap would allow the first end 238 to move with respect to the first clamp member 202, which in turn would allow the item to fall out of the harness.

Figure 4:
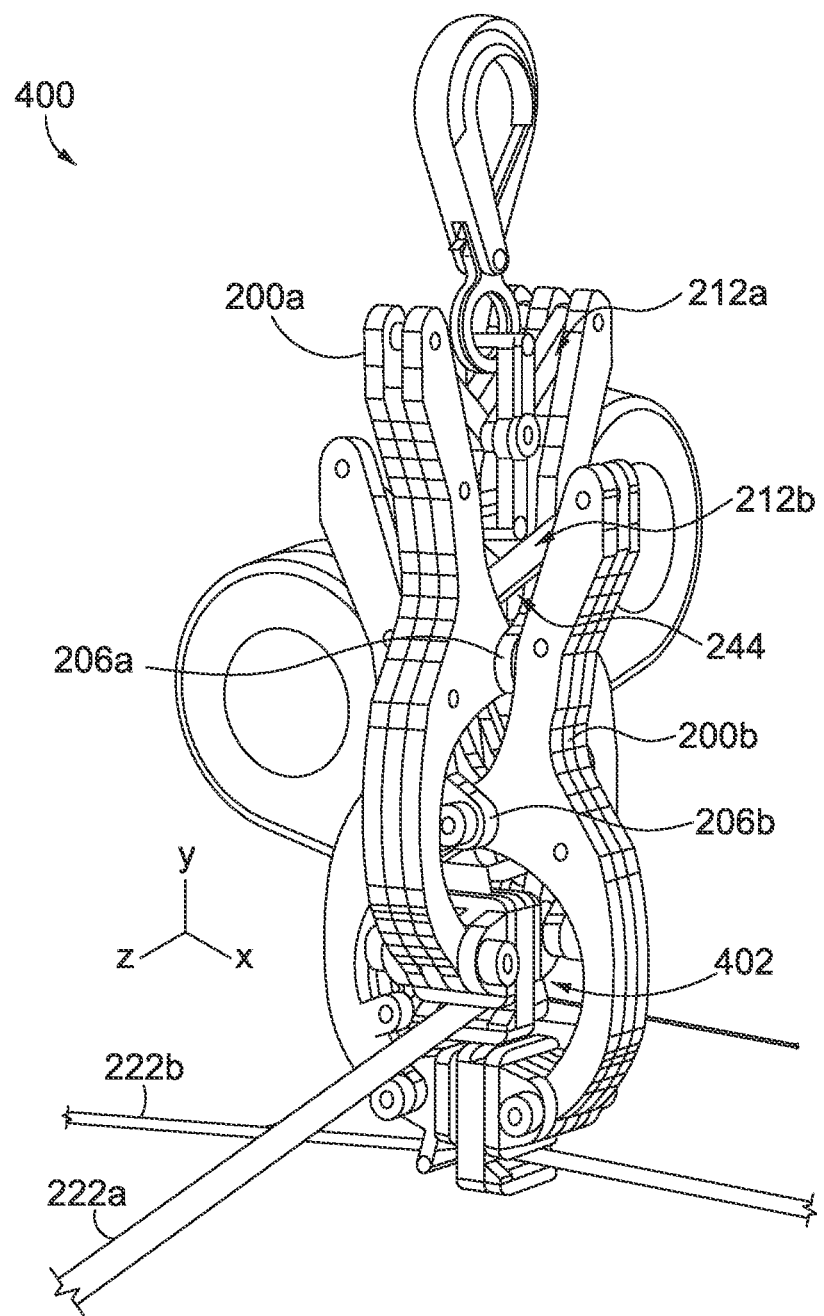
FIG. 4 is a perspective view the clamp depicted in FIGS. 2A-B that is used in combination with another clamp to secure an item, in accordance with aspects described herein.

It should be appreciated that the second ends 210a-b of the clamp 200 may include one or more guides (e.g., guides 308, 310, 312) that direct the strap 222 toward the one or more clamping surfaces (e.g., the first and second clamping surface 302, 304). The one or more guides may assist in directing a surface of the strap 222 in line with the one or more clamping surfaces (e.g., 302, 304). The one or more guides may also prevent the strap 222 from fully retracting. For example, a tab (not pictured) coupled to the second end 210b of the strap 222 may catch on guide 312, thereby preventing the second end 210b from retracting into a retractable device (retractable device 236). In some aspects, the retractable device 236 has a tensioning element that causes the strap 222 to wind up. Example tensioning elements include a spring (e.g., a torsional spring), pulley, elastic material, belt, or the like. It should be appreciated that the one or more guides (e.g., guide 312) may re-direct the strap 222 as it exits the retractable device 236 so that a second clamp may be used in combination with clamp 200, as illustrated in FIG. 4. It should be appreciated that retractably mounting the strap to the clamp provides a functional advantage because a retraction force provided by the retractable device 236 can assist in freeing the strap if it is caught between the item and the resting surface.

FIG. 4 is a perspective view a clamp 200a, such as the clamp 200 depicted in FIGS. 2A-B, that is used in combination with another clamp 200b to secure an item. The shape of the clamps 200a-b and the location of their components allow the clamps 200a-b to be interconnected (e.g., intercorolated) so as to act in a unified manner to secure an item (e.g., item 104) for transportation. For example, first clamp 200a may secure a first strap 222a extending in a first direction while the second clamp 200b may secure a second strap 222b that extends in a second direction. As described in greater detail below, the first and second clamp 200a-b may each simultaneously move to an open position (or a closed position) to simultaneously release (or secure) the item.

The first clamp 200a may secure a first strap 222a at a location that is offset (e.g., above or below) a location at which the second strap 222b is secured by the second clamp 200b. In some instances, the one or more second ends of the first clamp 200a may secure the strap at a location that is between the hinge 206b of the second clamp 200b and one or more second ends of the second clamp 200b. In some aspects, the first clamp 200a secures the first strap 222a in an opening 402 formed between the one or more second ends of the second clamp 200b.

The first and second clamp 200a-b may be positioned such that the linkage 212a of the first clamp 200a is positioned above (or below) the linkage 212b of the second clamp 200b. For example, as illustrated, the linkage 212b of the second clamp 200b is located between the linkage 212a and the hinge 206a of the first clamp 200a. Described differently, the linkage 212b of the second clamp 200b may be coupled to the first end of the second clamp 200b and extend through an opening (e.g., opening 244) formed by the one or more first ends of the first clamp 200a.

Figure 5:
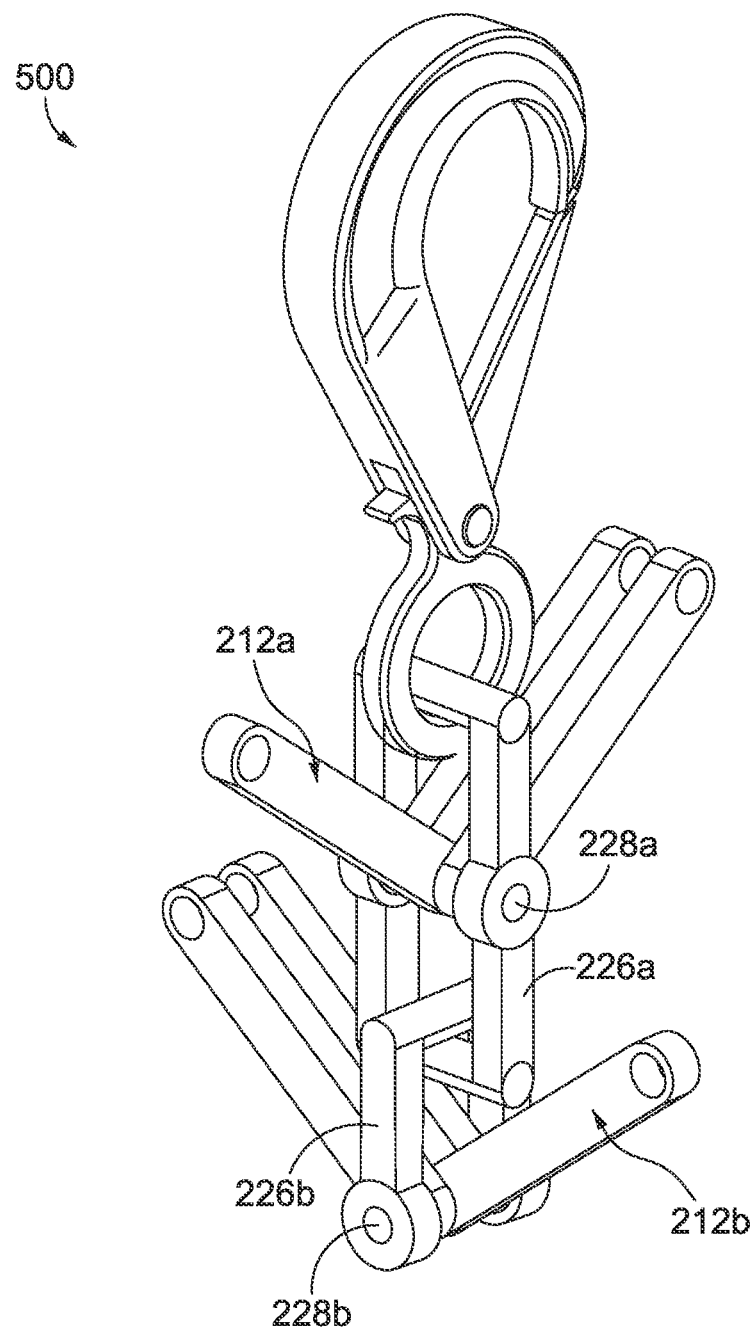
FIG. 5 is an enlarged, isolated view of linkages and coupling members depicted in FIG. 4, in accordance with aspects described herein.

FIG. 5 illustrates an enlarged, isolated view of the linkages (first and second linkages 212a-b) of the first and second clamp 200a-b of FIG. 4. The first and second linkages 212a-b may be coupled (e.g., interconnected) via one or more coupling members. As illustrated, the one or more coupling members may include a first and second coupling member 226a-b. The first and second coupling member 226a-b may move with respect to the first and second linkages 212a-b, respectively. For example, the first coupling member 226a may be pivotally coupled to the first linkage 212a at hinge 228a. Similarly, the second coupling member 226b may be pivotally coupled to the second linkage 212b at hinge 228b. While two coupling members are described as being distinct members, it is contemplated that the first and second coupling member 226a-b are not distinct members. For example, first and second coupling member 226a-b may be single coupling member that is pivotally coupled to both the first and second linkages 212a-b.

It should be appreciated that coupling (e.g., interconnecting) the first and second linkages 212a-b cause the simultaneous movement of the clamps 200a-b between the open and closed position. For example, the first coupling member 212a may be coupled to a line (e.g., line 110). Based on a tension in the line (e.g., when the item is lifted or suspended), the line may transfer a first directional force to the first coupling member 226a that is then transferred to the second coupling member 226b. Because the first and second coupling members 226*a-b* are coupled to the first and second linkages 212*a-b*, the first directional force may cause the first and second linkages 212*a-b* to each generate a second directional force. This, in turn, biases each individual clamp to the closed position, as described in greater detail with respect to FIGS. 2A-B. Further, when the item is resting on a surface (e.g., when item is not being lifted or suspended), the line may be slack (e.g., a lack of tension) and, thus, not transfer the first directional force. The lack of the first directional force may allow the first and second clamp 200*a-b* to move to the open position.

Figure 6:
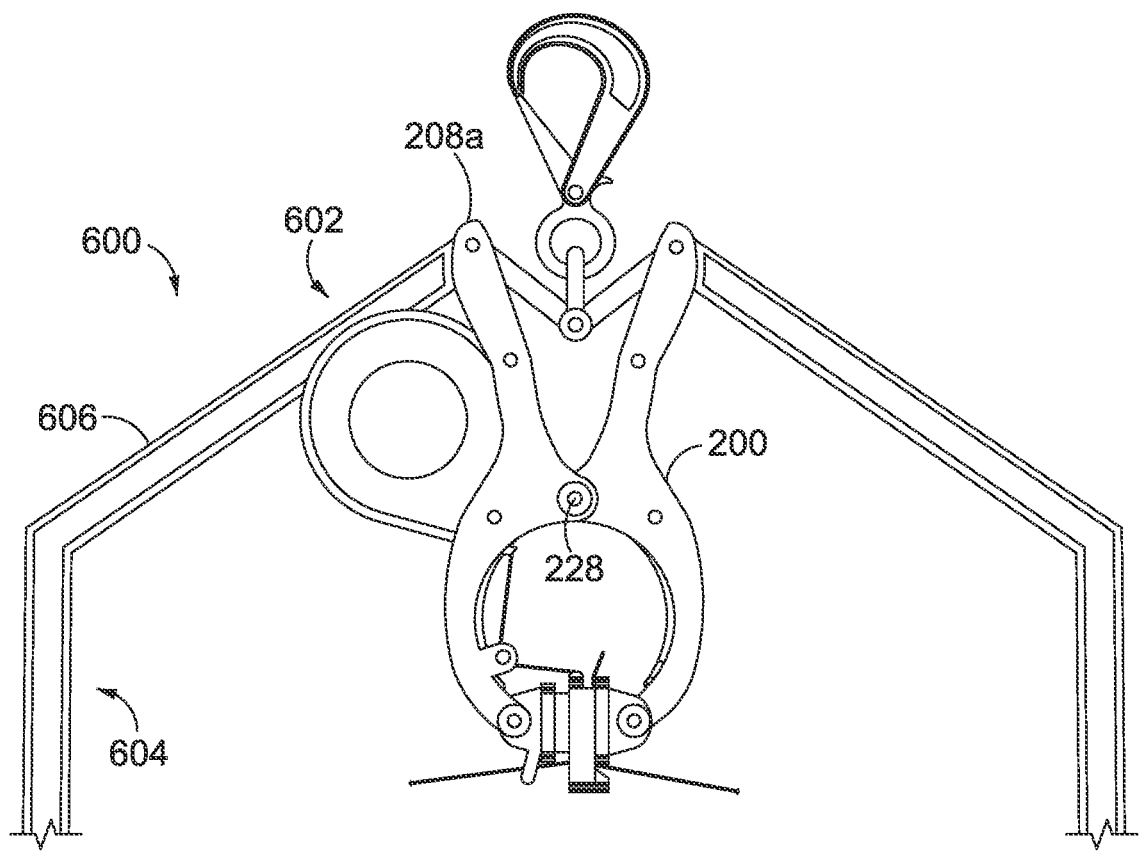
FIG. 6 is a planer view the clamp of FIGS. 2A-B having one or more extension members to bias the clamp to the closed position, in accordance with an aspect described herein.

FIG. 6 is a planar view of the clamp 200 of FIG. 2 having one or more extension members 600 to further bias the clamp to a closed position. The one or more extension members 600 include a first end 602, a second end 604, and a body 606 extending therebetween. The one or more extension members 600 may be integral to or distinct from a member of the clamp 200 (e.g. first or second clamp member 202, 204). Said differently, the one or more extension members 600 may be integral to a member of the clamp 200 such that both are a unified, single member. Alternatively, the one or more extension members 600 may be distinct from a member of the clamp 200 such that the one or more extension members 600 are a separate member that is coupled (or attached) to the clamp member.

As illustrated, the first end 602 of the one or more extension members 600 may be coupled to the first end 208*a* of the clamp 200. In some aspects, the body 606 extends away from the first end 208*a* of the clamp 200 so as to generate a torque about the hinge 228 of the clamp 200. The body 606 may extend horizontally or vertically away from the first end 208*a* of the clamp 200. In some aspects, the body 606 extends in a direction that is away from the hinge 228 of the clamp 200.

The one or more extension members 600 may bias the clamp 200 to the closed position. For instance, a fourth directional force may be generated by the one or more extension members 600 when the item (e.g., item 104) is suspended. In some aspects, the fourth directional force bias the clamp 200 to the closed position. The fourth directional force may be a torque that is generated by the weight of the extension member 600 with respect to the hinge 228. As illustrated, the fourth directional force may bias first ends 208*a-b* of the clamp 200 away from one another. This, in turn, causes the second ends 210*a-b* to move toward one another. It should be appreciated that in instances when the item is being lowered (or if the UAV 102 descends) too quickly, the weight of the item decreases, which is problematic since the clamping force is proportional to the weight of the item. The one or more extension members 600 may thus provide an additional directional force that generates an additional clamping force. As such, the clamp 200 may still be biased towards the close position even in instances where the weight of the item decreases.

Figure 7A:
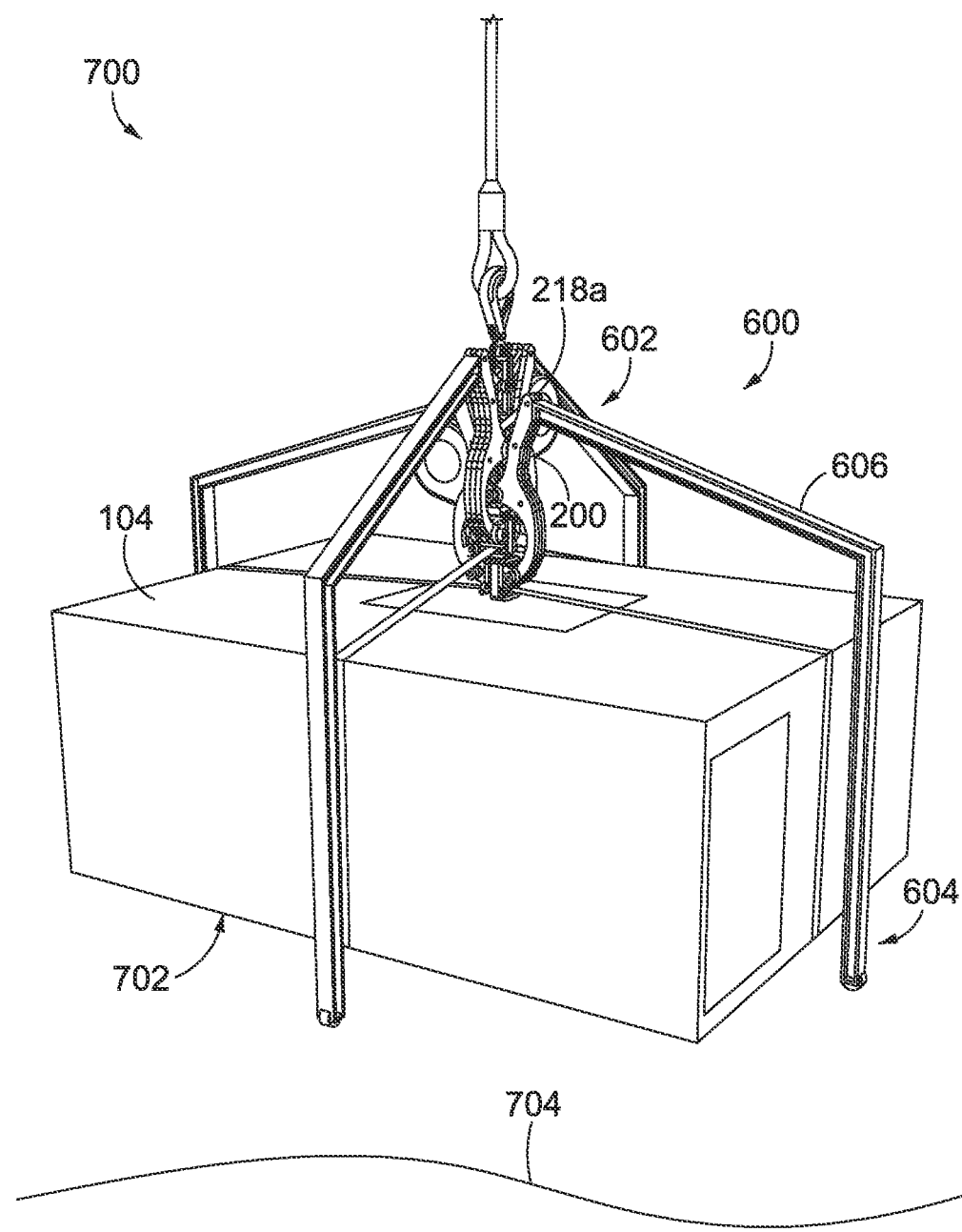
FIGS. 7A-B illustrate the one or more extension members of FIG. 6 biasing a plurality of clamps to the open position as the item moves from a suspended (or lifted) position to a resting position, in accordance with aspects described herein.
Figure 7B:
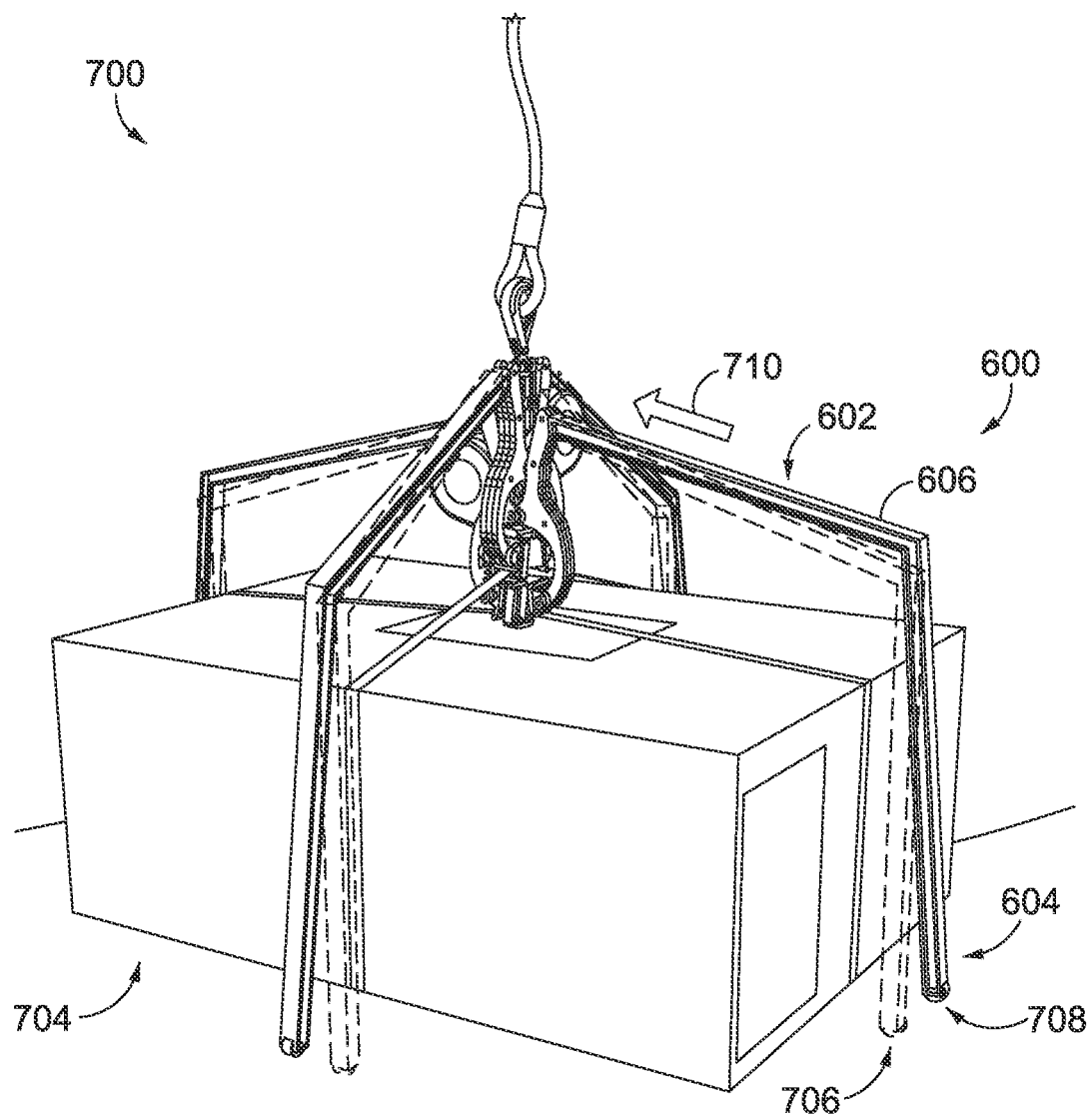

FIGS. 7A-B are perspective views of the extension member 600 of FIG. 6 that is used in combination with other extension members to bias a plurality of clamps to the open position as the item moves from a suspended (or lifted) position to a resting position. In particular, FIG. 7A depicts the clamp 200 and the one or more extension members 600 while the item 104 is being suspended, and FIG. 7B depicts the clamp 200 and the one or more extension members 600 while the item 104 is in a resting position on a surface 704 (e.g., the ground or a driveway of a person's home). As illustrated in FIG. 7B, the one or more extension members 600 may facilitate the opening of the plurality of clamps 200*a-b* as the item 104 moves to a resting position on the surface 704.

The one or more extension members 600 may be dimensioned so as to extend adjacent to a surface of an item that is secured by the strap (e.g. strap 222). For instance, the one or more extension members 600 may extend away from the first end 218*a* of the clamp 200 toward a first direction. As illustrated, the body 606 extends in the first direction that is adjacent to a surface of the item 104 when the item 104 is secured by the clamp 200. The body 606 of the one or more extension members 600 may also be described as extending in a horizontal and/or vertical direction so as to have a location that is adjacent to the item 104 that is secured by the clamp 200.

Continuing, the body 606 may extend to the second end 604. Specifically, the body 606 of the one or more extension members 600 may extend in a horizontal and/or vertical direction such that the second end 604 has a location that is vertically offset from a surface of the item 104 that is (or can be) secured by the clamp 200. Described differently, the body 606 of the one or more extension members 600 has one or more dimensions such that the second end 604 has a location that is vertically offset from a surface of the item 104 that is secured by the clamp 200. For instance, the second end 604 may be located such that it is positioned below a lower surface 702 of the item 104.

Continuing, and referring to FIG. 7B, the second end 604 may be vertically offset from item 104 when the item 104 is secured by the clamp 200 such that the second end 604 contacts a surface 704 (e.g., a resting surface 704) prior to the item 104 contacting the surface. Described differently, the second end 604 may engage the resting surface 704 prior to any surface of the item 104 contacting the resting surface 704. In some aspects, the second end 604 of the one or more extension members 600 may have a smooth surface or wheel (e.g., roller) that allows the second end 604 to move across the surface 704 as the item 104 is lowered to the resting position.

The contact between the second end 604 and the surface 704 may cause the body 606 to move from a first position 706 to a second position 708. As illustrated, a directional force 710 (e.g., a fifth directional force) is generated as the body 606 moves to the second position 708. The direction force 710 may bias the clamp 200 to the open position. For example, the directional force 710 may cause the first ends 208*a-b* of the clamp 200 toward one another. This, in turn, may cause the second ends 210*a-b* to move away from one another.

It should be appreciated that, in some aspects, the clamp 200 may have one or more tensioning elements that bias the clamp to the closed position. The tensioning element for biasing the clamp toward a particular position, including a spring (e.g., a torsional spring), pulley, elastic material, belt, or the like. The directional force 710 generated by the one or more extension members 600 contacting the surface 704 may resist (e.g., overcome or counteract) a bias of the tensioning element for biasing the clamp to the closed position so as to move the clamp 200 to the open position.

Figure 8:
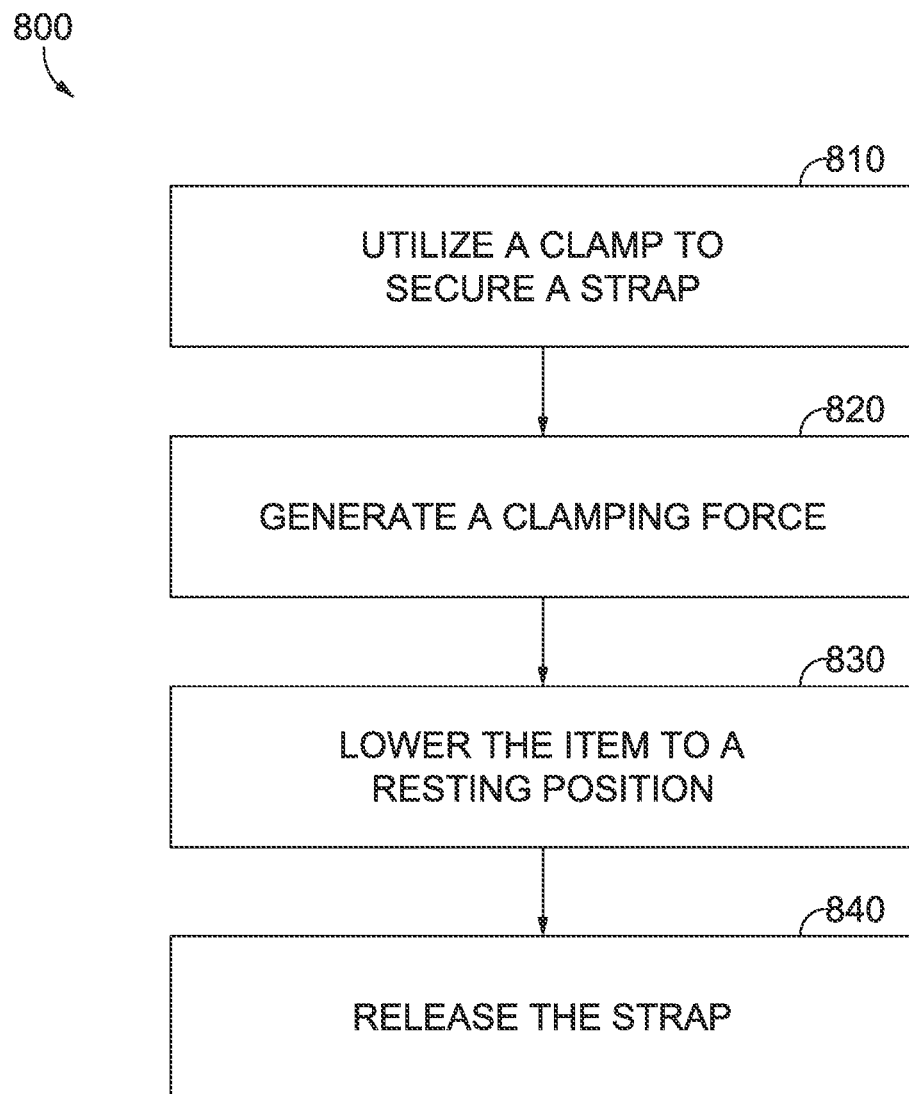
FIG. 8 is a block diagram illustrating an example method of delivering an item using the clamp of FIGS. 2A-2B.

FIG. 8 is a block diagram illustrating an example method 800 of moving items using the clamp 200 of FIGS. 2A-2B. At block 810, a clamp (e.g., clamp 200) is utilized to secure a strap (e.g., strap 222). The strap may be positioned around an item (e.g., item 104). The strap includes a first end (e.g., first end 238) and a second end (e.g., second end 240), and a body extending therebetween.

The first end of the strap may be mounted to the clamp, such as to a first clamp member (e.g., first clamp member 202). The second end (e.g., second end 240) of the strap may be secured when the clamp is moved to a closed position. In some aspects, the strap may be retractably mounted to the clamp (for example, within the retractable device 236). Accordingly, the second end of the strap may retract when the clamp is in the open position.

At block 820, a clamping force (e.g., clamping force 232) is generated. The clamping force may be proportional to a weight of the item and may be generated in response to suspending the item. The clamping force may bias the clamp to the closed position. The clamping force may be generated based on a first directional force (e.g., first directional force 224) being applied to a linkage (e.g., linkage 212) of the clamp.

At block 830, the item is lowered to a resting position on a surface. In some aspects, the weight of the item resting on the surface removes (e.g., eliminates or terminates) the clamping force. This may allow the clamp to move to an open position.

At block 840, the strap is released. Specifically, the second end of the strap is released in response to the clamp moving to the open position. For example, the second end of the strap may be free to move based on the clamp being in an open position. In some aspects, the strap may be retractably mounted to the clamp (e.g., via a retractable device). Retractably mounting the strap to the clamp may provide a functional advantage as it may assist in freeing the strap from being caught between the item and the resting surface when the item is delivered. Additionally or alternatively, the strap may be freed from being caught between the item and surface when a UAV ascends, which would pull the strap out from underneath the item.

In some aspects, the clamp is biased to the open position. For instance, a tensioning element may bias the clamp to the open position. The tensioning element may be any mechanism biasing the clamp to the open position, including a spring (e.g., a torsional spring), pulley, elastic material, belt, or the like. It should be appreciated that the clamping force generated by the linkage may resist (e.g., overcome) the bias of the tensioning element so as to bias the clamp to the closed position.

In some aspects, one or more extension members extend away from the clamp. For instance, the one or more extension members may extend from a first end (e.g., 208a) of a clamp member (e.g., first clamp member 202) and in a direction that is away from the first end. In some aspects, the one or more extension members may extend in a direction that will generate a torque about a hinge (e.g., hinge 206) that biases the clamp to a closed position.

In some aspects, the one or more extension members has a body (e.g., body 606) that extends from a first end (e.g., first end 602) of the one or more extension members to a second end (e.g., second end 604) of the one or more extension members. The one or more extension members may extend adjacent to an item that is secured by the clamp. In some instances, the second end of the one or more extension members may be vertically offset from a surface (e.g., lower surface 702) of the item. For example, the second end may be located below a lower-most surface of the item. Hence, the second end of the one or more extension members may engage a surface on which the item is resting so as to bias the clamp to the open position.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

As used in this disclosure, the word "delivery" is intended to mean both "to drop off" and "to pickup," unless one of the options is impracticable. For example, a "delivery vehicle" is a vehicle capable of picking up a parcel and dropping off a parcel at a location. Words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A clamp used in moving an item, the clamp having a closed position and an open position, the clamp comprising:
   a first clamp member having a first end and a second end;
   a second clamp member having a first end and a second end, the second clamp member pivotally coupled to the first clamp member; and
   a linkage coupled to the first end of the first clamp member and the first end of the second clamp member, the linkage generating a force to move the clamp to the closed position by moving the second end of the first clamp member and the second end of the second clamp member towards one another when a first directional force is applied to the linkage, and wherein the clamp secures a strap at the second end of the first clamp member when the clamp is in the closed position and releases the strap when the clamp is in the open position.

2. The clamp of claim 1, wherein the linkage extends into an opening formed between the first end of the first clamp member and the first end of the second clamp member.

3. The clamp of claim 2, wherein the first clamp member and the second clamp member are biased to the open position.

4. The clamp of claim 1, wherein the first directional force is a vertical force that is generated based on suspending the item.

5. The clamp of claim 1, wherein the open position of the clamp allows the strap to be retracted.

6. The clamp of claim 1, wherein the second end of the second clamp member comprises a protrusion that engages an aperture in the strap while the clamp is in the closed position.

7. The clamp of claim 6, wherein the protrusion generates a force against a surface of the strap so as to secure the strap at the second end of the first clamp member.

8. The clamp of claim 1, further comprising one or more extension members extending from the first ends of the first and second clamp members, wherein the one or more extension members bias the clamp to the closed position when the item is suspended.

9. The clamp of claim 7, further comprising one or more extension members extending from the first ends of the first and second claim members, wherein the one or more extension members bias the clamp to the open position in response to engaging a surface on which that the item is resting.

10. A clamping system, the clamping system comprising:
   a first clamp that moves from an open position to a closed position based on a first linkage generating a first clamping force when a first directional force is applied, the first clamp securing a first strap while in the closed position; and
   a second clamp that moves from an open position to a closed position based on a second linkage generating a second clamping force when the first directional force is applied, the second clamp securing a second strap while in the closed position, wherein the first linkage is coupled to the second linkage so as to simultaneously move in response to the first directional force.

11. The clamping system of claim 10, wherein each angle of the first clamping force and the second clamping force is within a range from about 0 degrees to 90 degrees with respect to the first directional force.

12. The clamping system of claim 10, wherein the first strap and the second strap are retractably mounted to the first clamp and the second clamp, wherein the first strap retracts when the first clamp is in the open position, and wherein the second strap retracts when the second clamp is in the open position.

13. The clamping system of claim 10, further comprising:
   a first clamp head that secures the first strap, the first clamp head having a protrusion that engages an aperture in the first strap when the first clamp is in the closed position; and
   a second clamp head that secures the second strap, the second clamp head having a protrusion that engages an aperture in the second strap when the second clamp is in the closed position.

14. The clamping system of claim 13, wherein the first clamp is biased to the open position based on a first tensioning element; and wherein the second clamp is biased to the open position based on a second tensioning element.

15. The clamping system of claim 10, wherein one or more extension members bias the first clamp to the open position in response to engaging a surface on which the an item that is being moved via the clamping system is resting; and wherein the one or more extension members bias the second clamp to the open position in response to engaging the surface on which the item is resting.

16. A method for transporting an item via an unmanned aerial vehicle (UAV), the method comprising:
   securing a strap around the item using a clamp, the strap having a first end and a second end, the first end of the strap mounted to the clamp and the second end of the strap secured by the clamp when the clamp is in a closed position;
   in response to suspending the item, generating a clamping force that is proportional to a weight of the item, the clamping force biasing the clamp to the closed position;
   lowering the item to a resting position on a surface, wherein the weight of the item resting on the surface removes the generated clamping force to allow the clamp to move to an open position; and
   releasing the second end of the strap in response to the clamp moving to the open position.

17. The method of claim 16, wherein a linkage coupled to a first end of the clamp generates the clamping force.

18. The method of claim 17, wherein the clamp is biased to an open position.

19. The method of claim 16, wherein the first end of the strap is retractably mounted to the clamp such that the second end of the strap retracts when the clamp is in the open position.

20. The method of claim 16, further comprising one or more extension members extending away from the clamp, the one or more extension members biasing the clamp to the open position in response to engaging the surface on which the item is resting.

* * * * *

UNITED STATES PATENT AND TRADEMARK OFFICE
CERTIFICATE OF CORRECTION

PATENT NO. : 11,773,885 B2
APPLICATION NO. : 17/136405
DATED : October 3, 2023
INVENTOR(S) : Julio Gil Page 1 of 1

It is certified that error appears in the above-identified patent and that said Letters Patent is hereby corrected as shown below:

In the Claims

Column 16, Line 5:
In the line reading "position in response to engaging a surface on which the an" should read
-- position in response to engaging a surface on which the --

Signed and Sealed this
Thirteenth Day of February, 2024

*Katherine Kelly Vidal*

Katherine Kelly Vidal
*Director of the United States Patent and Trademark Office*